United States Patent Office 3,050,471
Patented Aug. 21, 1962

3,050,471
POLYMERIZATION CATALYST
Arthur William Anderson and John MacMillan Bruce, Jr., Wilmington, Del., Nicholas G. Merckling, deceased, late of Wilmington, Del., by Noelle K. Merckling, administratrix, Baltimore, Md., and William Lawrence Truett, Wilmington, Del., assignors to E. I. du Pont de Nemours and Company, Wilmington, Del., a corporation of Delaware
No Drawing. Filed July 21, 1959, Ser. No. 828,447
34 Claims. (Cl. 252—429)

This invention relates to novel catalyst systems which are highly valuable for the production of solid ethylene polymers and copolymers.

Heretofore, it has been widely known that ethylene can be converted to solid polymers under very high pressures in the presence of catalysts which are capable of yielding free radicals under polymerization conditions.

It has also been known heretofore (U.S. Patents 2,212,-155; 2,475,520 and 2,467,234) that certain metal alkyls and Grignard reagents are capable of initiating the conversion of ethylene to solid polymers through a free radical mechanism. Ethylene has also been converted to solid polymers in the presence of hydrogenation catalysts, particularly in the presence of alkali metals or alkali metal hydrides (Bristish Patent 536,102).

Generally speaking, Friedel-Crafts type catalysts have not been effective for converting ethylene to solid polymers, but instead have resulted in the formation of liquid polymers from ethylene; however, it has recently been reported that solid polymers admixed with oils can be obtained by polymerizing ethylene in the presence of aluminum chloride and titanium chloride at elevated temperatures and pressures and advantageously in the presence of HCl-binding metals like aluminum powder (Fischer, German Patent 847,215 ausgegeben April 20, 1953).

In accordance with the present invention, it has been discovered that extraordinary and highly useful effects are produced when titanium at a valence state below three is combined with ethylenically unsaturated hydrocarbon compounds. In specific embodiments, it has been found that complexes containing titanium at a valence state below three can be effectively used in the polymerization of ethylenically unsaturated compounds, such as ethylene, propylene, butene-1 and related olefins. The complex, containing titanium in a valence state below three, may be obtained in a number of ways. In a preferred method, a titanium trihalide is admixed with a metallic reducing agent. The resulting reaction product contains the titanium in the catalytically active valence state.

The nature of these complexes is not fully understood, but they are active catalysts or catalyst components which are capable of initiating the polymerization of ethylene in an extremely active manner to produce solid ethylene polymers having relatively little side chain substitution. The density of the polymers obtained through the use of these complexes generally exceeds, at least to some extent, the density of polyethylene prepared by the use of free radical types of catalysts except those free radical polymerization processes which employ such extremely high pressures as to produce abnormally high density polyethylene as compared with polyethylene made at moderately high pressure (700 to 1200 atmospheres) by a free radical polymerization process (cf. U.S. Patent 2,586,833).

It is believed that the complexes hereinabove described are novel compounds which have not been employed heretofore in the polymerization of ethylene. The complexes are difficult to isolate in a pure state, but their presence can be detected from the chemical properties of the mixtures produced when a titanium compound having a valence state above 2 is reduced at least in part to a valence state of 2 and admixed with an ingredient which can form a complex with the titanium in its low state of valence.

The catalysts discovered in accordance with the present invention may furthermore be modified by the addition of a hindered Lewis base. The preferred Lewis bases include in particular secondary and tertiary amines, such as tri-n-butylamine, triethylamine, di-n-butylamine and N,N-dimethylaniline. In general, these amines contain from 3 to 18 carbon atoms. The amines are employed in molar ratios varying from 0.5 to 10 of the metallic reducing agent employed in combination with the titanium trihalide. The addition of the Lewis base causes, in general, an increase in the polymer yield obtainable with the novel catalysts of the present invention. Other beneficial effects are also obtainable. Thus, in the polymerization of ethylene, the addition of the hindered Lewis base will result in molecular weight control giving rise to polyethylene having substantial melt flow. In the polymerization of propylene, the addition of the hindered Lewis base will result not only in an increase in yield, but will also cause the formation of polymer with a higher molecular weight and a higher crystallinity.

So active, as ethylene polymerization catalysts, are the complexes hereinabove described that they can be used for polymerizing ethylene to solid polymers at room temperature and atmospheric pressure. These complexes can also be employed in the manufacture of numerous olefin polymers which heretofore have not been obtainable by any polymerization method whatever. Some of these novel polymers are polypropylene, polybutene, polyhexene, polyisobutylethylene, and copolymers of two or more olefins.

While the polymerization of olefins to produce solid polymers in the presence of the catalysts herein disclosed can be carried out under extremely mild conditions, as stated in the preceding paragraph, it is preferable from an economic standpoint to employ moderately high pressures, suitably from 10 to 200 atmospheres or higher, in order to facilitate the handling of the olefin. Much higher pressures, up to several thousand atmospheres, can be employed, but it is not economically desirable to do this in view of the extraordinary activity of the catalysts at lower pressures. Similarly, extremely low temperatures may be employed. The preferred temperatures, however, are within the range of about 0° to 300° C.

The polymerization of olefins, according to the process of this invention, takes place most satisfactorily when the polymerization mixture is substantially moisture-free and also free of other sources of hydroxyl groups. Since water reacts with the catalyst, as hereinabove explained, the water content of the mixture should be kept at the lowest practicable minimum. As in numerous other ethylene polymerization processes, the polymerization mixture in the process of this invention is preferably kept free of oxygen, since oxygen reacts with the catalyst. In practical operations, the oxygen content should preferably be held below 20 parts per million. Certain compounds which are known to be polymerizable and which are capable of coordinating with the titanium at a valence state of 2 form complexes which are too stable for optimum results, and accordingly, the presence of these compounds should preferably (although not necessarily) be avoided. In this category are ketones and esters. Hydrocarbon solvents, on the other hand, can be used quite effectively.

Among the metallic reducing agents which are most effective for reducing the valence of the titanium to an average of below 3, the following may be mentioned:

(1) Grignard reagents.
(2) Metal alkyls or aryls and similar organometallic compounds, having general formulas $MR_n$, $MR_{n-m}X_m$, where M is the metal, R the hydrocarbon radical, $n$ the valence of the metal, X a radical such as hydrogen or halogen and $m$ an integer smaller than the valence number of the metal.

(3) Zinc metal and metals above zinc in the electromotive series.

(4) Metal hydrides.

The preferred metallic reducing agents are those where at least one hydrocarbon radical is bonded to a metal.

Specific examples of metallic reducing agents which react with titanium trihalides to form active catalysts are ethyl magnesium bromide, ethyl magnesium chloride, propyl magnesium bromide, butyl magnesium chloride, phenyl magnesium bromide, ethyl zinc chloride, butyl zinc bromide, aluminum trimethyl, aluminum triethyl, aluminum triisobutyl, aluminum trioctyl, aluminum triphenyl, lithium butyl, lithium phenyl, sodium phenyl, dimethyl magnesium, diethyl magnesium, diphenyl magnesium, zinc dimethyl, zinc dibutyl, zinc diphenyl, cadmium dimethyl, cadmium diethyl, cadmium diheptyl, mercury dimethyl, mercury diphenyl, tin tetraethyl, tin tetrabutyl, tin tetraphenyl, lithium aluminum tetraheptyl, lithium aluminum tetracyclohexenylethyl, sodium aluminum tetrabutyl, magnesium aluminum pentaethyl, sodiumboro tetrabutyl, diethyl aluminum chloride, dibutyl aluminum fluoride, diphenyl aluminum bromide, tributyl tin chloride, dibutyl tin chloride, monoethyl aluminum bromide, diisobutyl aluminum hydride, tetraethyl lead, tetraphenyl lead, sodium, lithium, aluminum sodium hydride, lithium hydride, lithium aluminum hydride, aluminum hydride and tin hydride.

The titanium trihalides employed to form the novel catalysts include the fluoride, iodides, bromides and chlorides, the latter two of which are preferred.

The catalyst of this invention is not only useful in the manufacture of ethylene homopolymers but is effective also in the manufacture of such copolymers as ethylene-propylene, ethylene-butadiene and other ethylene copolymers in which the comonomer is a compound containing an ethylenic bond. Many of these copolymers have properties which differ very widely from copolymers of the prior art, containing the same components.

To further illustrate the various aspects of the present invention, the preferred embodiments thereof, and the advantageous results to be obtained thereby, the following examples are included. Unless otherwise indicated all parts and percentages used herein are by weight. As a convenient shorthand, all density values are given herein as merely a number; it will be understood that the units of these density values are grams per cubic centimeter. All melt indexes given in the following examples are determined by using the method of ASTM-1238-57-T. All mole quantities used herein are gram-moles unless otherwise stated.

*Example I*

Into a reaction vessel was placed 10 ml. of a 3 molar solution of ethyl magnesium bromide in diethyl ether, 7 grams of titanium trichloride, and 100 ml. of n-hexane. The vessel was evacuated and flushed with nitrogen three times, pressured to 500 p.s.i. with ethylene and heated for 2.1 hours at 93° C. to 160° C., maximum pressure being 2500 p.s.i. Ethylene was injected periodically during the run to keep the pressure above 1400 p.s.i. during nearly all of the polymerization period. The mixture thus obtained was withdrawn, and polymer was separated by washing with methanol-HCl, methanol-NaOH and methanol. The polymer weighed 105 grams and was so high in molecular weight as to make viscosity determination in decahydronaphthalene extremely difficult.

*Example II*

A 1 liter stirred flask was flushed with nitrogen and 500 ml. of decahydronaphthalene added. The flask and contents were heated to 140° C. and 1 millimole of brown $TiCl_3$ and 1.5 millimoles of aluminum tri-isobutyl were added. Ethylene was introduced to the flask and the reaction was allowed to proceed for two hours. Sufficient ethylene was added during the course of the reaction to maintain the pressure in the flask at approximately ambient atmospheric pressure.

The reaction mixture was diluted with 50 ml. of n-butyl alcohol and the solid polymer filtered out. After the filter cake was washed with cyclohexane and dried there was recovered 14 grams of tough, stiff polyethylene having a melt index of 0.01.

*Example III*

A stirred 1 liter flask containing 500 ml. of decahydronaphthalene was flushed with nitrogen, heated to a 140° C. and there was added 1 millimole of brown titanium trichloride and 0.5 millimole of lithium aluminum tetraheptyl. Ethylene was introduced to the flask under approximately ambient atmospheric pressure. Sufficient ethylene was allowed to flow into the polymerization vessel to maintain the pressure for a period of 25 minutes whereupon the addition was discontinued and 50 ml. of 1-butanol added. The reaction mixture was cooled, filtered and washed twice with cyclohexane. There was recovered 4.0 grams of exceptionally tough, stiff polyethylene.

*Example IV*

A stirred 1 liter flask containing, under atmosphere of nitrogen, 1 millimole of brown titanium trichloride and 500 ml. of decahydronaphthalene was heated to 140° C. The contents of the flask were saturated with ethylene, and 1.5 millimoles of diphenyl magnesium were added. The temperature of the flask was maintained at 140° C. and there was added to the reaction vessel 100 ml. per minute of ethylene for a period of 43 minutes. The reaction was terminated by adding 100 ml. of 1-butanol. The supernatant liquid was filtered from the reaction mixture and the filter cake washed with cyclohexane and dried. There was recovered 5.1 grams of polyethylene having a melt index of less than 0.001.

*Example V*

A 2 liter stirred reactor was charged with 1000 ml. of cyclohexane saturated with propylene while a propylene atmosphere was maintained in the reactor. There was added 3 millimoles of brown titanium trichloride and 5 millimoles aluminum tri-isobutyl. The mixture was stirred for three hours, capped and allowed to stand 64 hours. The polymer was present in the reaction mixture as a brown precipitate. There was added to the reaction mixture 50 ml. of i-propanol and 50 ml. of methanol. The polymer was separated by filtration washed with methanol, and dried. The resulting polymer was colorless polypropylene having a melt index of 0.30, a density of 0.8722, a stiffness of 2500 p.s.i. and crystallinity of 33%.

*Example VI*

Into a glass-lined steel reactor was charged 250 ml. of cyclohexene, 2.0 millimoles of titanium trichloride and 3.0 millimoles of aluminum tri-isobutyl. The reactor was shaken for ½ hour to disperse the catalyst and then charged with propylene to 60 p.s.i.g. which required approximately 29 grams of propylene. After standing 24 hours at room temperature the pressure had dropped to 35 p.s.i.g. There was added 50 ml. of a i-propanol-methanol mixture, the polymer separated and washed with methanol. The dried polymer weighed 36.5 g., had a crystallinity of 38%, a melt index of 0.30. A beading of the polymer exhibited a 602% elongation before rupture and a tensile strength of 1151 p.s.i. with a proportional limit of 451 p.s.i.

*Example VII*

Into a glass-lined steel reactor was charged 250 ml. of cyclohexane, 4.5 millimoles of titanium trichloride, 13.5 millimoles of aluminum diethyl bromide, and 30 grams of propylene. The reaction mixture was shaken for 6 hours in which time the pressure dropped from the original 60 p.s.i.g. to 32 p.s.i.g. The mixture was allowed to stand overnight and an additional pressure drop of 2 p.s.i. was noted. The polymer was precipitated with methyl alcohol, separated, washed and dried. There was recovered 24 grams of polypropylene having a melt index of 45.0 and a crystallinity of 29%. A beading of the polymer exhibited a tensile strength of 464 p.s.i. and a 612% elongation before rupture.

*Example VIII*

Using substantially the same procedure and equipment as in Example VII, propylene was polymerized using 3.0 millimoles brown titanium trichloride and 4.5 millimoles of diphenyl magnesium as a catalyst. There was recovered 30 grams of polypropylene having a melt index of 2.8 and a crystallinity of 32%.

*Example IX*

Into a 300 ml. glass-lined pressure reactor was charged 200 ml. of perchloroethylene, 5.0 millimoles of diethyl aluminum bromide, 1.0 millimole of aluminum tri-isobutyl and 1.5 millimoles of brown titanium trichloride. The reaction vessel was pressured with propylene to 60 p.s.i.g., shaken for 24 hours and allowed to stand for an additional 40 hours. After precipitation and washing with alcohol, there was recovered 29 grams of polymer having a melt index of 1.37, a density of 0.8643, a crystallinity of 18%, and a stiffness of 1550 p.s.i.

*Example X*

Into a 300 ml. glass-lined reactor was charged 250 ml. cyclohexane, 0.05 mole dodecene-1, 5.0 millimoles of aluminum tri-isobutyl and 1.2 mm. brown titanium trichloride. The reactor was pressured with propylene to 60 p.s.i.g. and shaken for 16 hours. There was recovered 36 grams of polymer having a melt index of 0.49, a density of 0.8961 and crystallinity of 64%.

*Example XI*

Into a 300 ml. glass-lined reactor was charged 250 ml. cyclohexane, 0.05 mole octadecene-1, 5.0 millimoles of aluminum tri-isobutyl, 1.2 millimoles of brown titanium trichloride. The reactor was pressured with propylene to 60 p.s.i.g. and shaken for 16 hours. There was recovered 21.8 grams of copolymer having a melt index of 0.17, a density of 0.8860 and a crystallinity of 52%.

*Example XII*

Into a 300 ml. glass-lined reactor was charged 250 ml. of cyclohexane, 2.5 millimoles of brown titanium trichloride and 1.0 millimole of aluminum tridecyl. This mixture was stirred 24 hours, an additional 3.5 millimoles of aluminum tridecyl was added and the vessel was pressured to 60 p.s.i.g. with propylene. After shaking for 16 hours, diluting with alcohol, filtering and washing with alcohol, there was recovered 68 grams of polymer having a melt index of 0.33, a density of 0.8704, and crystallinity of 37%.

*Example XIII*

A 500 ml. stirred flask containing 200 ml. of decahydronaphthalene was heated to 70° C. and saturated with propylene. There was added 10 millimoles of violet titanium trichloride and 20 millimoles aluminum tri-isobutyl. After 6 hours the reaction was terminated by the addition of 200 ml. of n-butyl alcohol. There was recovered 9.65 grams of crystalline polypropylene.

*Example XIV*

Into a 330 ml. stainless steel reaction vessel was charged 6 grams of brown titanium trichloride, 0.35 g. of aluminum dust and 150 ml. of n-heptane. The vessel was pressured to 800 p.s.i. with ethylene and heated for 1.1 hours at 140° C. to 199° C., maximum pressure being 2550 p.s.i.g. Ethylene was injected periodically during the run to keep the pressure above 1500 p.s.i. There was recovered tough, stiff polypropylene.

*Example XV*

Into a 500 ml. stirred flask containing 200 ml. of decahydronaphthalene was added 2.0 millimoles of violet titanium trichloride, and 6.0 millimoles of aluminum triethyl. With the temperature at 110° C. propylene was passed into the reaction mixture for 6 hours. The reaction was terminated by the addition of 100 ml. of n-butyl alcohol. After washing with methanol there was recovered 10 grams of polypropylene having a density of .9004, a melt index of 12.3 and a crystallinity of 62%.

*Example XVI*

Into a 500 ml. stirred flask containing 200 ml. of decahydronaphthalene was added 2.0 millimoles of violet titanium trichloride, 6.0 millimoles of aluminum triethyl and 6.0 millimoles of tri-n-butyl amine. With the temperature at 110° C., propylene was passed into the reaction mixture for 1 hour. The reaction was terminated by the addition of 100 ml. of n-butyl alcohol. After washing with methanol there was recovered 16.3 grams of polypropylene having a density of .9016, a melt index of 1.77 and a crystallinity of 66%. Comparing this example with Example XV shows that considerable improvement in melt index and yield were obtained by adding tri-butyl amine.

*Example XVII*

Into a 500 ml. stirred flask containing 200 ml. of decahydronaphthalene was charged 2.0 millimoles of violet titanium trichloride, 6.0 millimoles of aluminum triethyl and 36.0 millimoles of tri-n-butyl amine. With the temperature at 110° C. propylene was passed into the reaction mixture for 1 hour. The reaction was terminated by the addition of 100 ml. of n-butyl alcohol. After washing with methanol, there was recovered 10.6 grams of polypropylene having a density of .9209, a melt index of 0.023 and crystallinity of 74%.

*Example XVIII*

Into a 500 ml. stirred flask containing 200 ml. of decahydronaphthalene was charged 2.0 millimoles of violet titanium trichloride, 6.0 millimoles of aluminum tri-isobutyl and 12.0 millimoles of triethyl amine. With the temperature at 110° C., propylene was passed into the reaction mixture for 1 hour. The reaction was terminated by the addition of 100 ml. of n-butyl alcohol. After washing with methanol, there was recovered 7.6 grams of polypropylene having a density of .9080, a melt index of 0.055 and a crystallinity of 71. Substantially the same results are obtained by substituting aluminum triethyl for the aluminum tri-isobutyl of this example.

*Example XIX*

Into a 500 ml. stirred flask containing 200 ml. of decahydronaphthalene was charged 2.0 millimoles of violet titanium trichloride, 6.0 millimoles of aluminum triethyl and 6.0 millimoles of di-s-butyl amine. The reaction was terminated with 100 ml. of n-butyl alcohol after passing propylene into the reaction mixture for 1 hour. After washing with methanol, there was recovered 8.0 grams of polypropylene having a density of .9340, a melt index of 0.014 and a crystallinity of 73%.

*Example XX*

Into a 500 ml. stirred flask containing 200 ml. of decahydronaphthalene was charged 2.0 millimoles of titanium trichloride, 6.0 millimoles of aluminum triethyl and 9.0 millimoles of di-isopropyl ether. With the temperature at 110° C. propylene was passed into the reaction mixture for 1 hour. The reaction was terminated by the addition of 100 ml. of n-butyl alcohol. After washing with methanol there was recovered 10.0 grams of polypropylene having a density of .899, a melt index of 8.0 and a crystallinity of 61%.

Example XXI

Into a 500 ml. stirred flask containing 200 ml. of decahydronaphthalene was charge 2.0 millimoles of violet titanium trichloride, 6.0 millimoles of aluminum triethyl and 12.0 millimoles of tri-n-butyl phosphine. With the temperature at 110° C. propylene was passed into the reaction mixture for 1 hour. The reaction was terminated by the additive of 100 ml. of n-butyl alcohol. After washing with methanol there was recovered 1.2 grams of polypropylene having a density of .905, a melt index of 4.3 and a crystallinity of 67%.

Example XXII

Into a 500 ml. stirred flask containing 200 ml. of decahydronaphthalene was charged 2.0 millimoles of violet titanium trichloride, 6.0 millimoles of aluminum triethyl, and 12.0 millimoles of hexamethylbenzene. With the temperature at 110° C. propylene was passed into the reaction mixture for 1 hour. The reaction was terminated by the addition of 100 ml. of n-butyl alcohol. After washing with methanol, there was recovered 3.8 grams of polypropylene having a density of .906, a melt index of 5.6 and a crystallinity of 64%.

Example XXIII

Into a 500 ml. stirred flask containing 200 ml. of decahydronaphthalene was charged 2.0 millimoles of violet titanium trichloride, 6.0 millimoles of aluminum triethyl and 12.0 millimoles of N,N-dimethyl-aniline. With the temperature at 110° C. propylene was passed into the reaction mixture for 1 hour. The reaction was terminated by the addition of 100 ml. of n-butyl alcohol. After washing with methanol there was recovered 19.4 grams of polypropylene having a density of .907, a melt index of 1.2 and a crystallinity of 64%.

Example XXIV

Into a 300 ml. glass-lined reactor was charged 100 ml. of cyclohexane, 2.1 millimoles of violet titanium trichloride, 9.4 millimoles of lithium butyl. The reaction was heated to 112° C. and pressured to 300 p.s.i. with propylene. After shaking for 1 hour the pressure was released, the reaction mixture diluted with alcohol, filtered and washed with more alcohol. There was recovered 3.4 grams of polypropylene having a density of 0.909, a melt index of less than 0.001 and a crystallinity of 58%.

Example XXV

Into a 500 ml. stirred flask was charged 250 ml. of decahydronaphthalene, 3.0 millimoles of titanium tribromide, and 6.0 millimoles of aluminum triethyl. With the temperature at 140° C. ethylene was passed into the reaction mixture. There was recovered tough, stiff polyethylene.

Example XXVI

Into a 500 ml. stirred flask was charged 200 ml. of decahydronaphthalene, 2 millimoles of violet titanium trichloride and 1.32 millimoles of tin tetrabutyl. With the temperature at 120° C., propylene was passed into the mixture for 1½ hours. The reaction was terminated with 50 ml. of n-butyl alcohol. There was recovered 0.2 grams of crystalline polypropylene.

Example XXVII

Into a 500 ml. stirred flask was charged 200 ml. of decahydronaphthalene, 2.0 millimoles of violet titanium trichloride, and 4.0 millimoles of aluminum trimyricyl. With the temperature at 120° C., propylene was passed into the reaction mixture for 2 hours. The reaction was terminated by the addition of 50 ml. of n-butyl alcohol. There was recovered 1.75 grams of polypropylene having a density of 0.8986, a melt index of 4.53 and a crystallinity of 46%.

Example XXVIII

Into a 500 ml. stirred flask was charged 200 ml. of decahydronaphthalene, 2.3 moles of titanium trichloride and 6 millimoles of lithium aluminum tetraisobutyl. With the temperature at 120° C., ethylene was passed into the reaction mixture for 3½ hours. After terminating the reaction with n-butyl alcohol, there was recovered 12 g. of tough, stiff polyethylene.

It is to be observed that the foregoing examples are illustrative only and that numerous embodiments of the invention will occur to those who are skilled in the art.

As hereinabove indicated, the reducing component of the polymerization mixture can be varied rather widely, but it is essential that the reducing component be a sufficiently strong reducing agent and also that it be employed in sufficient quantity to reduce the valence of the titanium, at least in part, to 2. This is generally accomplished by employing a molar ratio of reducing agent to titanium trihalide varying from 0.3 to 10.

The products obtained by polymerizing ethylene with catalysts hereinabove disclosed are solid polymers exclusively and are not contaminated with Friedel-Crafts type of oily polymers.

The examples further illustrate the beneficial effect and control over molecular weight obtained by the addition of the hindered Lewis bases.

The quantity of catalyst employed can be varied over a rather wide range. It is desirable to employ a quantity of catalyst which is at least large enough to produce a reasonably rapid rate for a reasonably long period of time. Suitably, the preferred quantity is within the range of 0.001 to 10% based on the weight of Ti per unit weight monomer.

The polymers which are made under the conditions hereinabove described frequently have such tremendously high molecular weights that removal of catalyst by dissolving and filtering is extremely difficult. The best procedure for obtaining the polymer in a clean form is to wash with acetone-hydrochloric mixture in a Waring Blendor several times followed by washing with acetone and thereafter, if necessary, followed by several acetone-aqueous sodium hydroxide washes and finally by acetone-water wash. Finally, the polymer can be washed with acetone. The products thus obtained are generally snow-white. While this procedure is highly satisfactory for preparing clean polymer, it is to be understood that simpler procedures, such as treatment with water at elevated temperatures, will be entirely suitable for various practical applications. For other practical applications it is not essential to remove traces of catalyst.

The structure of the polyethylene made in accordance with the process of this invention evidently is characterized by being a straight chain hydrocarbon, with vinyl groups at one or both ends of at least some of the molecules. The infrared measurements indicate very little methyl substitution and a very small number of vinylidene groups with little or no trans-unsaturation or carbonyl groups.

The ethylene polymers obtained in accordance with the process of this invention are highly valuable in numerous applications especially in the form of films, molded articles, extruded insulation on wire, etc. In those embodiments in which the catalyst is not removed from the polymeric product or is only incompletely removed, the products are thermally stable, somewhat surprisingly. When the polymerization is carried out in a system in which the catalyst is dissolved in the inert medium (e.g. when the titanate ester contains octyl groups or other similar groups or when it contains methyl groups but the reducing agent contains phenyl, octyl or other similar group which can interchange with methyl) the polymer precipitates from the polymerization mixture in a form which may contian measurable amounts of titanium, e.g. as much as 0.5%. Such compositions are highly useful despite their content of titanium.

This application is a continuation in part of copending application S.N. 450,243, filed August 16, 1954, now U.S. Patent No. 2,905,645.

We claim:

1. A catalyst composition consisting essentially of the reaction product obtained on admixing a titanium trihalide with an organometallic compound containing at least one hydrocarbon radical bonded to metal, the quantity of the organometallic compound being sufficient to lower the valence state of the titanium, at least in part, to below three.

2. The catalyst composition as set forth in claim 1 wherein the titanium trihalide is titanium trichloride.

3. The catalyst composition as set forth in claim 1 wherein the titanium trihalide is titanium tribromide.

4. The catalyst composition as set forth in claim 1 wherein the organometallic compound is an alkyl metal halide.

5. The catalyst composition as set forth in claim 4 wherein the alkyl metal halide is alkyl magnesium halide.

6. The catalyst composition as set forth in claim 4 wherein the alkyl metal halide is an alkyl aluminum halide.

7. The catalyst composition as set forth in claim 1 wherein the organometallic compound is an alkyl metal hydride.

8. The catalylst composition as set forth in claim 7 wherein the alkyl metal hydride is an alkyl aluminum hydride.

9. The catalyst composition set forth in claim 1 wherein the organometallic compound is an aryl metal halide.

10. The catalyst composition of claim 1 wherein the molar ratio of the organometallic compound to the titanium trihalide varies from 0.3 to 10.

11. A catalyst composition consisting essentially of the reaction product obtained on admixing a titanium trihalide with an organometallic compound having the general formula $MR_n$ where M is a metal, R a hydrocarbon radical, and $n$ the valence state of the metal, the quantity of the organometallic compound being sufficient to lower the valence state of the titanium, at least in part, to below three.

12. A catalyst composition consisting essentially of the reaction product obtained on admixing a titanium trihalide with a metal alkyl, the quantity of metal alkyl being sufficient to lower the valence state of the titanium, at least in part, to below three.

13. The catalyst composition as set forth in claim 12 wherein the metal alkyl is aluminum trialkyl.

14. The catalyst composition as set forth in claim 12 wherein the metal alkyl is a magnesium dialkyl.

15. The catalyst composition set forth in claim 12 wherein the metal alkyl is a tin tetraalkyl.

16. The catalyst composition as set forth in claim 12 wherein the metal alkyl is an alkali metal alkyl.

17. The catalyst composition as set forth in claim 16 wherein the alkali metal alkyl is a lithium alkyl.

18. The catalyst composition as set forth in claim 12 wherein the metal alkyl is an alkali metal aluminum alkyl.

19. The catalyst composition as set forth in claim 18 wherein the alkali metal aluminum alkyl is a lithium aluminum alkyl.

20. A catalyst composition consisting essentially of the reaction product obtained on admixing a titanium trihalide with a metal aryl, the quantity of the metal aryl being sufficient to lower the valence state of the titanium, at least in part, to below three.

21. The catalyst composition as set forth in claim 20 wherein the metal aryl is aluminum triaryl.

22. The catalyst composition set forth in claim 20 wherein the metal aryl is magnesium diaryl.

23. A catalyst composition consisting essentially of the reaction product obtained on admixing a titanium trihalide with a metal hydride, the quantity of said metal hydride being sufficient to lower the valence state of the titanium, at least in part, to below three.

24. The catalyst composition as set forth in claim 23 wherein the metal hydride is an alkali metal aluminum hydride.

25. The catalyst composition set forth in claim 24 wherein the alkali metal aluminum hydride is lithium aluminum hydride.

26. A catalyst composition consisting essentially of the reaction product obtained on admixing a titanium trihalide with a metal selected from the group consisting of alkali metals, alkaline earth metals and aluminum, the quantity of said metal being sufficient to lower the valence state of the titanium, at least in part, to below three.

27. The catalyst composition set forth in claim 26 wherein the metal is aluminum.

28. A catalyst composition consisting essentially of catalytic quantities of an amine selected from the class consisting of tertiary and secondary amines containing from 6 to 18 carbon atoms and the reaction product of titanium trihalide with an organometallic compound having the formula $MR_n$ wherein M is a metal, R a hydrocarbon radical, and $n$ the valence state of the metal, the molar ratio of the organometallic compound to the titanium trihalide being from 0.3 to 10, and the molar ratio of the said amine to the organometallic compound being from 0.5 to 10.

29. The catalyst composition as set forth in claim 28 wherein the organometallic compound is aluminum trialkyl.

30. The catalyst composition as set forth in claim 28 wherein the amine is a tertiary amine.

31. The catalyst composition as set forth in claim 30 wherein the tertiary amine is tri-n-butyl amine.

32. The catalyst composition as set forth in claim 30 wherein the tertiary amine is tri-alkyl amine.

33. A catalyst composition consisting essentially of the reaction product obtained on admixing titanium trichloride with an alkyl magnesium halide, the quantity of said alkyl magnesium halide being sufficient to lower the valence state of the titanium, at least in part, to below three.

34. The catalyst composition of claim 33 wherein the alkyl magnesium halide is ethyl magnesium bromide.

References Cited in the file of this patent

UNITED STATES PATENTS

| | | |
|---|---|---|
| 2,822,357 | Brebner et al. | Feb. 4, 1958 |
| 2,868,772 | Ray et al. | Jan. 13, 1959 |
| 2,879,263 | Anderson et al. | Mar. 24, 1959 |
| 2,909,510 | Thomas | Oct. 20, 1959 |

UNITED STATES PATENT OFFICE
CERTIFICATE OF CORRECTION

Patent No. 3,050,471                                August 21, 1962

Arthur William Anderson et al.

It is hereby certified that error appears in the above numbered patent requiring correction and that the said Letters Patent should read as corrected below.

Column 6, line 2, for "polypropylene" read -- polyethylene --; column 7, line 71, for "trimyricyl" read -- trimyrcyl --.

Signed and sealed this 4th day of December 1962.

(SEAL)
Attest:

ERNEST W. SWIDER                                        DAVID L. LADD
Attesting Officer                                           Commissioner of Patents